(12) United States Patent
Ahn et al.

(10) Patent No.: US 10,984,568 B2
(45) Date of Patent: Apr. 20, 2021

(54) METHODS, DEVICES, AND COMPUTER-READABLE MEDIA FOR SHARING IMAGE EFFECTS

(71) Applicant: Snow Corporation, Seongnam-si (KR)

(72) Inventors: Dookyung Ahn, Seongnam-si (KR); Min Kyoung Kim, Seongnam-si (KR); Seonju Lee, Seongnam-si (KR); Geen-Sil Lee, Seongnam-si (KR); Tae Hwan Park, Seongnam-si (KR)

(73) Assignee: Snow Corporation, Gyeonggi-do (KR)

( * ) Notice: Subject to any disclaimer, the term of this patent is extended or adjusted under 35 U.S.C. 154(b) by 0 days.

(21) Appl. No.: 16/387,908

(22) Filed: Apr. 18, 2019

(65) Prior Publication Data
US 2019/0244409 A1    Aug. 8, 2019

Related U.S. Application Data

(63) Continuation of application No. PCT/KR2016/011681, filed on Oct. 18, 2016.

(51) Int. Cl.
*G06F 3/0482*    (2013.01)
*G06T 11/60*    (2006.01)
(Continued)

(52) U.S. Cl.
CPC ............ *G06T 11/60* (2013.01); *G06F 3/0482* (2013.01); *G06F 3/04845* (2013.01);
(Continued)

(58) Field of Classification Search
CPC .................................................. G06F 3/0482
(Continued)

(56) References Cited

U.S. PATENT DOCUMENTS 8,640,023 B1 *    1/2014    Murray ................. G06F 40/169
                                              715/232
9,449,412 B1 *    9/2016    Rogers ............... G06K 9/00315
(Continued)

FOREIGN PATENT DOCUMENTS

CN    103597519A A    2/2014
CN    105765990 A    7/2016
(Continued)

OTHER PUBLICATIONS

Stephen Glasskeys, "How to open specific web browsers using hyperlinks", available on Nov. 30, 2015, available at <<https://www.computerworld.com/article/3008858/how-to-open-specific-web-browsers-using-hyperlinks.htm>>, 6 pages (Year: 2015).*
(Continued)

*Primary Examiner* — Daniel Rodriguez
(74) *Attorney, Agent, or Firm* — Harness, Dickey & Pierce, P.L.C.

(57) ABSTRACT

Provided are methods, servers, and computer-readable media for sharing an effect for an image. An effect sharing method may include: receiving, from a first electronic device, a sharing request for an effect set that is applied to an image by an image editing logic of the first electronic device, wherein the sharing request includes an identifier of the effect set; generating a link for sharing the effect set; and sending the link in response to the sharing request.

18 Claims, 17 Drawing Sheets

(51) Int. Cl.
| | |
|---|---|
| *G06K 9/00* | (2006.01) |
| *H04L 29/08* | (2006.01) |
| *G06F 3/0484* | (2013.01) |
| *H04N 21/236* | (2011.01) |
| *H04N 5/265* | (2006.01) |
| *H04N 9/74* | (2006.01) |
| *H04W 4/18* | (2009.01) |
| *G06T 5/50* | (2006.01) |
| *H04W 4/80* | (2018.01) |

(52) U.S. Cl.
CPC .......... *G06K 9/00228* (2013.01); *G06T 5/50* (2013.01); *H04L 67/02* (2013.01); *H04N 5/265* (2013.01); *H04N 9/74* (2013.01); *H04N 21/236* (2013.01); *H04W 4/18* (2013.01); *G06T 2200/24* (2013.01); *H04W 4/80* (2018.02)

(58) Field of Classification Search
USPC .................................................. 715/748
See application file for complete search history.

(56) References Cited

U.S. PATENT DOCUMENTS

| | | | | |
|---|---|---|---|---|
| 9,460,462 | B1* | 10/2016 | Walker | A45D 44/005 |
| 9,860,255 | B2* | 1/2018 | Byrne | H04L 63/0838 |
| 10,257,251 | B1* | 4/2019 | Leblang | G06F 3/0482 |
| 2004/0230663 | A1* | 11/2004 | Ackerman | H04N 1/00137 709/207 |
| 2005/0243381 | A1* | 11/2005 | Hill | H04N 1/0014 358/453 |
| 2006/0085841 | A1* | 4/2006 | Chavis | G06F 21/31 726/4 |
| 2006/0187241 | A1* | 8/2006 | Boler | G06T 11/60 345/660 |
| 2009/0002386 | A1* | 1/2009 | Jalon | G06F 9/451 345/581 |
| 2009/0234716 | A1* | 9/2009 | Mallick | G06F 3/0482 705/14.54 |
| 2010/0094729 | A1* | 4/2010 | Gray | G06Q 30/0601 705/26.1 |
| 2010/0223128 | A1* | 9/2010 | Dukellis | H04N 5/23245 705/14.51 |
| 2010/0274714 | A1* | 10/2010 | Sims | G06Q 50/184 705/40 |
| 2011/0093361 | A1* | 4/2011 | Morales | G06Q 30/0603 705/26.62 |
| 2011/0107263 | A1* | 5/2011 | Ivanov | G06Q 10/087 715/823 |
| 2011/0231778 | A1* | 9/2011 | Hoag | G06F 16/972 715/745 |
| 2012/0173008 | A1* | 7/2012 | Wang | G11B 27/034 700/94 |
| 2012/0188411 | A1* | 7/2012 | Jang | H04N 5/2621 348/239 |
| 2012/0331108 | A1* | 12/2012 | Ferdowsi | 709/219 |
| 2013/0110890 | A1* | 5/2013 | Bailor | H04L 67/06 707/827 |
| 2013/0198602 | A1* | 8/2013 | Kokemohr | G06F 40/169 715/233 |
| 2013/0223819 | A1 | 8/2013 | Sims et al. | |
| 2013/0260893 | A1 | 10/2013 | Shin et al. | |
| 2013/0332543 | A1 | 12/2013 | Shin et al. | |
| 2014/0019540 | A1 | 1/2014 | Shin et al. | |
| 2014/0176565 | A1* | 6/2014 | Adeyoola | G06F 16/5854 345/473 |
| 2014/0181198 | A1* | 6/2014 | Motes | H04L 67/104 709/204 |
| 2014/0201848 | A1* | 7/2014 | Kulkarni | G06F 21/6218 726/27 |
| 2014/0281954 | A1* | 9/2014 | Ullrich | G06F 3/04883 715/702 |
| 2014/0372236 | A1* | 12/2014 | Sylvester | G06Q 30/0201 705/22 |
| 2015/0256679 | A1* | 9/2015 | Burnett | H04M 3/53366 379/88.12 |
| 2015/0264015 | A1* | 9/2015 | Cialdea | G06F 21/6245 726/26 |
| 2015/0317406 | A1* | 11/2015 | Bort | G06F 3/04842 715/234 |
| 2015/0324103 | A1* | 11/2015 | Tepmongkol | G06Q 50/01 715/757 |
| 2016/0026253 | A1* | 1/2016 | Bradski | H04N 13/344 345/8 |
| 2016/0162024 | A1* | 6/2016 | Bombacino | G06F 3/0488 345/156 |
| 2016/0202882 | A1* | 7/2016 | Mortillaro | G06T 13/80 715/719 |
| 2016/0277781 | A1* | 9/2016 | Lennon | H04N 21/8126 |
| 2016/0330400 | A1* | 11/2016 | Long | H04N 21/2356 |
| 2017/0063763 | A1* | 3/2017 | Hu | H04L 51/063 |
| 2017/0185365 | A1* | 6/2017 | Sugaya | G09B 19/0023 |
| 2017/0195401 | A1* | 7/2017 | Shin | H04L 67/1097 |
| 2017/0256084 | A1* | 9/2017 | Iglehart | G06K 9/00221 |
| 2017/0364692 | A1* | 12/2017 | Lopez-Uricoechea | G06F 16/94 |
| 2018/0191797 | A1* | 7/2018 | Javier | G06F 40/174 |
| 2018/0225087 | A1* | 8/2018 | Lin | G06F 3/0219 |

FOREIGN PATENT DOCUMENTS

| | | |
|---|---|---|
| JP | 2001-109696 A | 4/2001 |
| JP | 2007-013896 A | 1/2007 |
| JP | 2009-124516 | 6/2009 |
| JP | 2014-149697 A | 8/2014 |
| JP | 2015-529031 A | 10/2015 |
| KR | 20060134557 A | 12/2006 |
| KR | 20110025718 A | 3/2011 |
| KR | 20160011745 A | 2/2016 |
| KR | 20160061451 A | 6/2016 |
| WO | WO-2015/065001 A1 | 5/2015 |

OTHER PUBLICATIONS

International Search Report (PCT/ISA/210) for International Application No. PCT/KR2016/011681 dated Jul. 10, 2017.
Japanese Office Action dated Jul. 21, 2020 by the Japanese Patent Office corresponding to Japanese patent application No. 2019-541057.
Chinese Office Action dated Aug. 31, 2020 by the Chinese Patent Office corresponding to Chinese patent application No. 201680089823.3.

* cited by examiner

METHODS, DEVICES, AND COMPUTER-READABLE MEDIA FOR SHARING IMAGE EFFECTS

CROSS-REFERENCE TO RELATED APPLICATIONS

This application is a continuation of, and claims the benefit under 35 U.S.C. § 365(c) to, PCT Application No. PCT/KR2016/011681, filed Oct. 18, 2016, the disclosure of which is incorporated herein in its entirety by reference.

TECHNICAL FIELD

Example embodiments relate to an effect sharing method and system for an image and a computer program stored in a non-transitory computer-readable storage medium to perform the effect sharing method on a computer in conjunction with the computer.

BACKGROUND

Some computing scenarios may include applying various effects to an image. For example, a service may permit virtually displaying effects applied to a picture or a video containing an appearance of a user as if an actual product, such as cosmetics, is used and allowing the user to preview a result of using the actual product without purchasing the actual product.

BRIEF SUMMARY

According to an aspect of at least one example embodiment, an effect sharing method includes receiving, from a first electronic device, a sharing request for an effect set that is applied to an image by an image editing logic of the first electronic device, wherein the sharing request includes an identifier of the effect set; generating a link for sharing the effect set; and sending the generated link in response to the sharing request.

According to an aspect of at least one example embodiment, an effect sharing method may include receiving a sharing request including an identifier of an effect set; generating a control instruction for applying the effect set; and sending the control instruction to the electronic device in response to the sharing request.

According to an aspect of at least one example embodiment, a non-transitory computer-readable storage medium may store instructions that, when executed, cause a computer to perform an effect sharing method including presenting a plurality of effect sets applicable to an image displayed on a screen through an image editing logic for editing the image; applying, to the image, an effect set selected from among the plurality of effect sets to the image; sending, to an effect sharing server, a sharing request including an identifier of the effect set; receiving a link to the effect set in response to the sharing request; and sending the link and the identifier to complete the sharing request.

According to an aspect of at least one example embodiment, a non-transitory computer-readable storage medium may store instructions, that when executed, cause a computer to perform an effect sharing method including extracting, from a parameter of a first image, an identifier of an effect set applied to the first image; sending a sharing request including the identifier to an effect sharing server; receiving, in response to the sharing request, a control instruction for applying the effect set; and applying the effect set to a second image in response to the control instruction.

According to an aspect of at least one example embodiment, an effect sharing server may comprise a memory storing instructions and a processor configured by the instructions to receive, from a first electronic device, a sharing request for an effect set that is applied to an image by an image editing logic of the first electronic device, generating a link for sharing the effect set, and sending the link in response to the sharing request.

DETAILED DESCRIPTION

Hereinafter, some example embodiments will be described with reference to the accompanying drawings.

An effect sharing system according to some example embodiments may be configured through an electronic device or a server that is described below, and an effect sharing method according to some example embodiments may be performed through the electronic device or the server. For example, an application configured as a computer program according to some example embodiments may be installed and executed on the electronic device, and the electronic device may perform the effect sharing method for the electronic device according to some example embodiments under control of the executed application. Also, the server may perform the effect sharing method for the server by providing an effect sharing service to the electronic device through interaction with the application. The computer program may be stored in a non-transitory computer-readable storage medium to perform the effect sharing method for the electronic device on the electronic device configured as a computer in conjunction with the electronic device.

Figure 1:
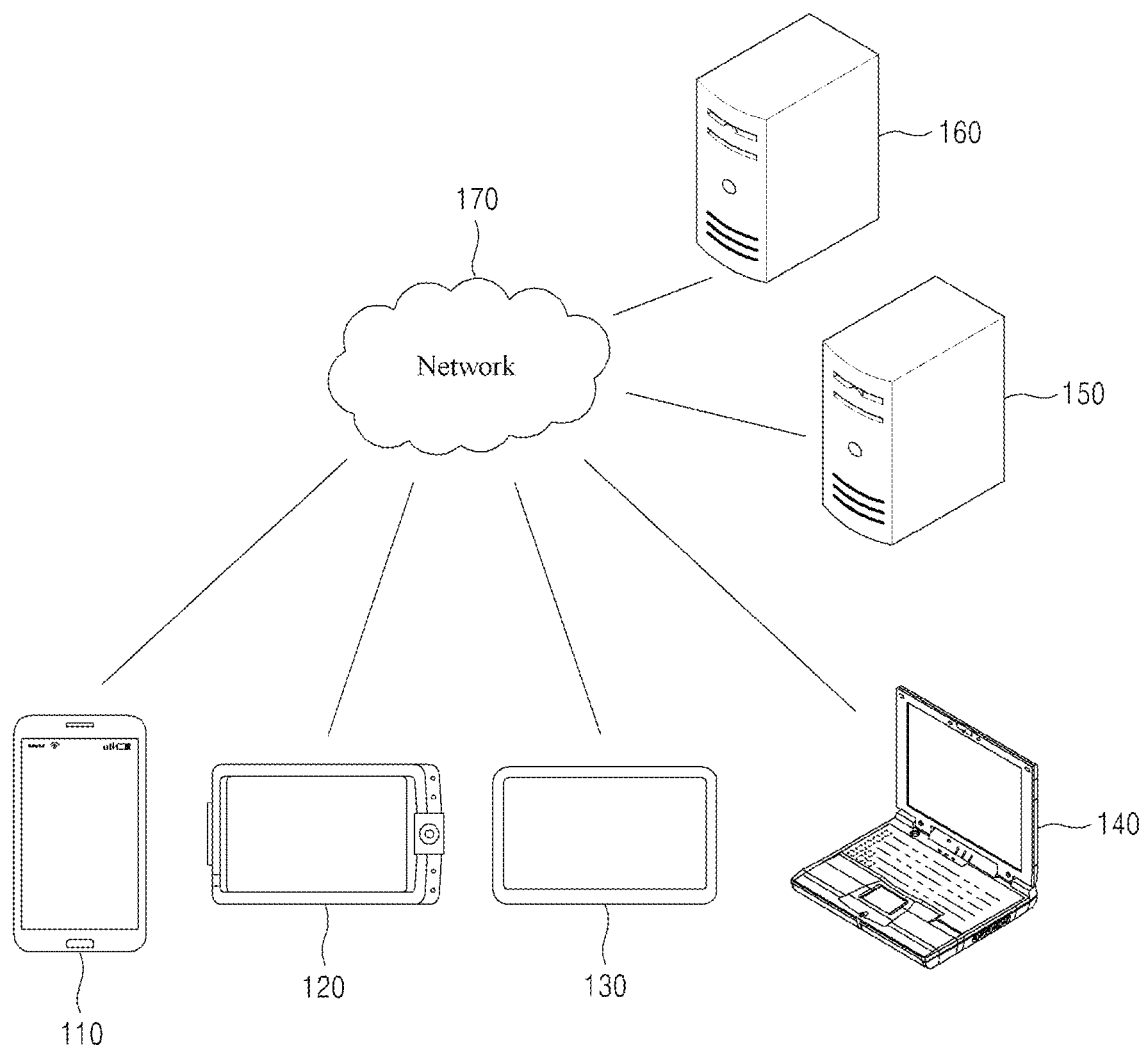
FIG. 1 is a diagram illustrating an example of a network environment according to at least one example embodiment.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices or a number of servers are not limited thereto.

Each of the plurality of electronic devices 110, 120, 130, and 140 may be a fixed terminal or a mobile terminal configured as a computer apparatus. For example, the plurality of electronic devices 110, 120, 130, and 140 may be a smartphone, a mobile phone, a navigation, a computer, a laptop computer, a digital broadcasting terminal, a personal digital assistant (PDA), a portable multimedia player (PMP), and a tablet personal computer (PC). For example, although FIG. 1 illustrates a shape of a smartphone as an example of the electronic device (1) 110, the electronic device (1) 110 may indicate one of various devices capable of communicating with other electronic devices 120, 130, and 140, and/or the servers 150 and 160 over the network 170 in a wireless communication manner or in a wired communication manner.

The communication scheme is not particularly limited and may include a communication method using near-field communication between devices and/or communication using a communication network, for example, a mobile communication network, the wired Internet, the wireless Internet, a broadcasting network, etc., which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, it is only an example and some example embodiments are not limited thereto.

Each of the servers 150 and 160 may be configured as a computer apparatus or a plurality of computer apparatuses that provides instructions, codes, files, contents, services, and the like, through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, the server 160 may be a system that provides an installation file for installing an application, for example, a computer program, to the plurality of electronic devices 110, 120, 130, and 140 as the second service. Also, the server 150 may be a system that provides the first service for a service, for example, a game service, a social network service (SNS), a messaging service, a content streaming service, an image editing service, and/or a service for sharing an effect applied to an image, linked with the corresponding application.

Some example embodiments may apply one or more effects and/or effect sets to a still image, such as a photograph, and/or a set of still images, such as a photo album. Other example embodiments may apply one or more effects and/or effects sets to moving images, such as frames of a video. Still other embodiments may apply effects and/or effect sets to other types of images, such as three-dimensional images like binocular and/or stereographic images.

Figure 2:
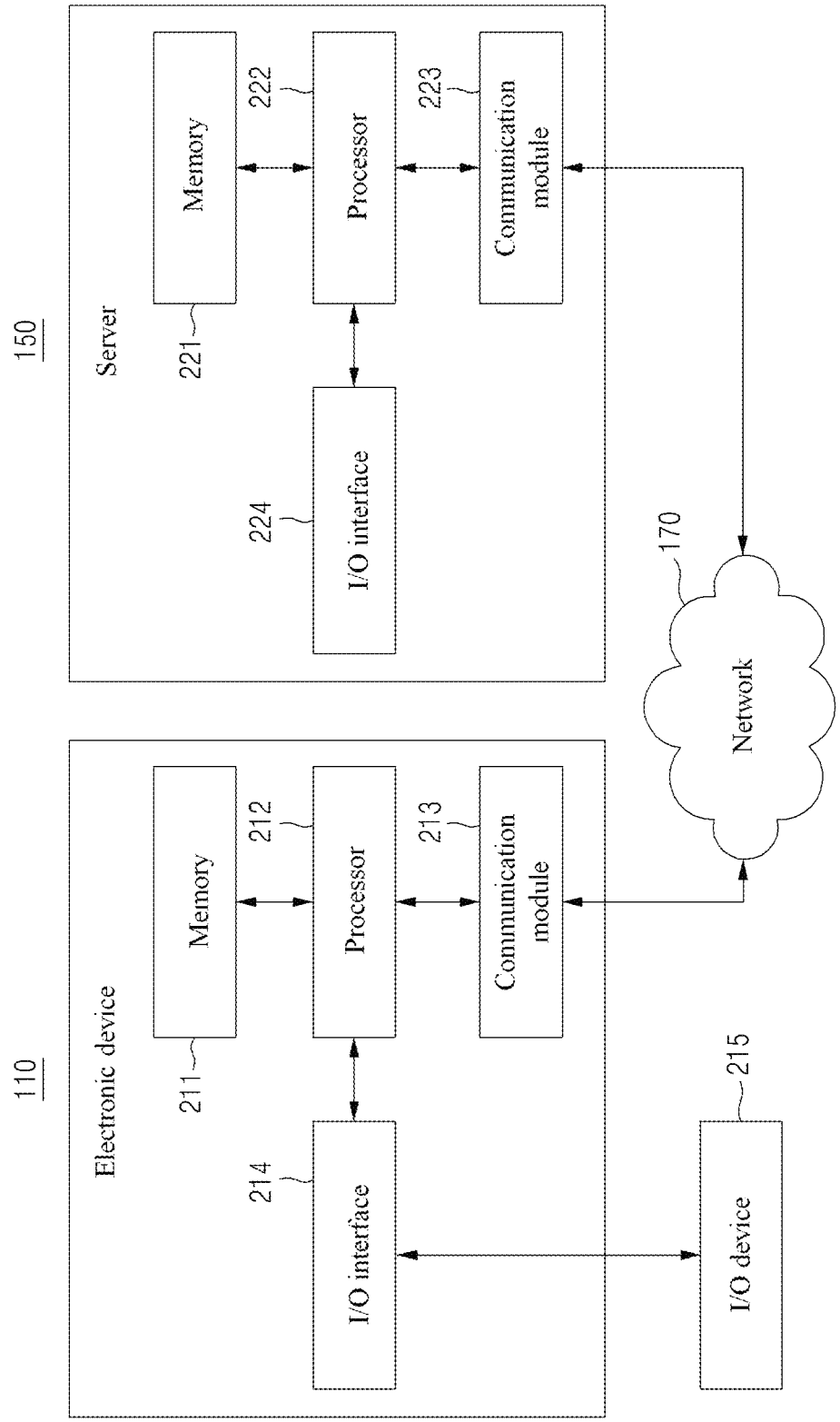
FIG. 2 is a block diagram illustrating a configuration of an electronic device and a server according to at least one example embodiment.

FIG. 2 is a block diagram illustrating an example of an electronic device according to some example embodiments and/or a server according to some example embodiments. FIG. 2 illustrates a configuration of the electronic device (1) 110 as an example embodiment for a single electronic device and illustrates a configuration of the server 150 as an example embodiment for a single server. The same or similar components may be applicable to other electronic devices 120, 130, and 140, or the server 160.

Referring to FIG. 2, the electronic device (1) 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), a read only memory (ROM), and a disk drive, as a non-transitory computer-readable storage medium. The permanent mass storage device such as ROM and disk drive may be included in the electronic device (1) 110 or the server 150 as a permanent storage device separate from the memory 211, 221. Also, an OS or at least one program code, for example, a code for a browser installed and executed on the electronic device (1) 110 or an application installed and executed on the electronic device (1) 110 to provide a specific service, may be stored in the memory 211, 221. Such software components may be loaded from another non-transitory computer-readable storage medium separate from the memory 211, 221. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 211, 221 through the communication module 213, 223, instead of the non-transitory computer-readable storage medium. For example, at least one program may be loaded to the memory 211, 221 based on a program, for example, the application, installed by files provided over the network 170 from developers or a file distribution system, for example, the server 150, which provides an installation file of the application.

The processor 212, 222 may be configured to process computer-readable instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide functionality for communication between the electronic device (1) 110 and the server 150 over the network 170 and may provide functionality for communication with another electronic device, for example, the electronic device (2) 120 or another server, for example, the server 160. For example, the processor 212 of the electronic device (1) 110 may transfer a request created based on a program code stored in the storage device such as the memory 211, to the server 150 over the network 170 under control of the communication module 213. Inversely, a control signal, an instruction, content, a file, etc., provided under control of the server 150 may be received at the electronic device (1) 110 through the communication module 213 of the electronic device (1) 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device (1) 110.

The I/O interface 214 may be a device used for interface with an I/O device 215. For example, an input device may include a device, such as a keyboard and a mouse, and an output device may include a device, such as a display. As another example, the I/O interface 214 may be a device for interface with an apparatus in which an input function and an output function are integrated into a single function, such as a touchscreen. The I/O device 215 may be configured as a single device with the electronic device (1) 110. Also, the I/O interface 224 of the server 150 may be a device for interface with an apparatus (not shown) for input or output that may be connected to the server 150 or included in the server 150. In detail, when processing instructions of the computer program loaded to the memory 211, the processor 212 of the electronic device (1) 110 may be configured to display a service screen using data provided from the server 150 or the electronic device (2) 120 and/or to display content on a display through the I/O interface 214.

According to other example embodiments, the electronic device (1) 110 and the server 150 may include a larger or smaller number of components than a number of components shown in FIG. 2. Some components according to related art may be omitted from illustrations such as FIG. 2.

For example, an electronic device (1) 110 may include at least a portion of the I/O device 215, or may further include other components, for example, a transceiver, a global positioning system (GPS) module, a camera, a variety of sensors, a database (DB), and the like. In detail, if the electronic device (1) 110 is a smartphone, the electronic device (1) 110 may be configured to further include a variety of components, for example, an accelerometer sensor, a gyro sensor, a camera module, various physical buttons, a button using a touch panel, an I/O port, a vibrator for vibration, etc., which are generally included in the smartphone.

Figure 3:
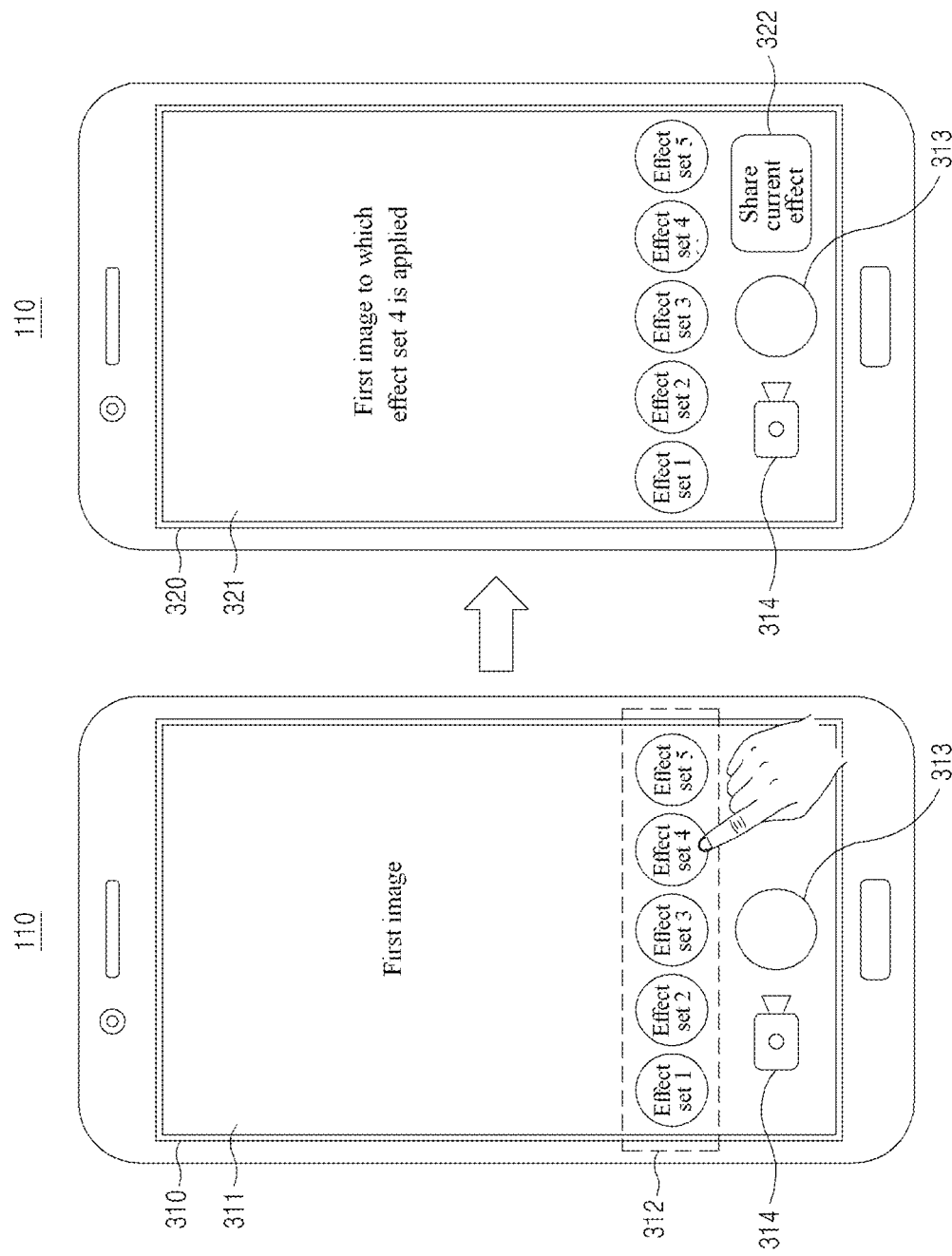
FIG. 3 illustrates an example of a configuration of applying an effect set to an image and displaying the image to which the effect set is applied according to at least one example embodiment.

FIG. 3 illustrates an example of applying an effect set to an image and displaying the image to which the effect set is applied according to some example embodiments. FIG. 3 illustrates an example of changing a first screen of the electronic device (1) 110 with a second screen 320.

Referring to FIG. 3, a first screen 310 represents a user interface that is provided through an application installed on the electronic device (1) 110 and a first image 311 is displayed on the first screen 310. A first box 312 indicated with dotted lines represents a plurality of effect sets provided from the application. The plurality of effect sets may be sets of different effects, for example, a set of specific makeup effects. In detail, each effect set may include components as shown in Table 1.

TABLE 1

| Effect | Component | Type | Size | Blending | Description |
| --- | --- | --- | --- | --- | --- |
| 1 | Lipstick | LUT | 512 × 512 | n/a | ... |
| 2 | Blush | Image | 750 × 1000 | multiply (default) normal (possible) | ... |
| 3 | Eyeshadow | Image | 560 × 400 | multiply (default) normal (possible) | ... |
| 4 | Makeup effect | Image | 560 × 400 | normal (default) | ... |
| 5 | Eyeline | Image | 560 × 400 | multiply (default) normal (possible) | ... |
| 6 | Eyelash | Image | 560 × 400 | multiply (default) normal (possible) | ... |
| 7 | Lens | LUT | 64 × 64 | n/a | ... |
| 8 | Tattoo | Image | 750 × 1000 | normal (default) multiply (possible) | ... |
| 9 | Foundation | LUT | 512 × 512 | n/a | ... |

Referring to Table 1, a LUT refers to a lookup table that may be in a form of a function that receives a red, green, blue (RGB) value of an input image as an input parameter and calculates an output RGB value for the input RGB value as a result. For example, a lipstick effect with a type of LUT may be applied to a lip region recognized in an image by receiving an RGB value of the recognized lip region as an input parameter, by calculating an output RGB value for the input RGB value as a result, and by applying the calculated output RGB value to the image. Blending refers to mixing of two or more components. For example, a "multiply" condition of a blusher may indicate that a single blusher effect may be implemented by mixing a plurality of blusher effects, and a "normal" condition of the blusher may indicate that an effect of a single blusher may be included. A component included for each effect set and an effect for each individual component may differ. For example, referring to FIG. 3, a lipstick effect included in "effect set 1" and a lipstick effect included in "effect set 2" may include LUTs of different colors, respectively. Selecting a "description" option of Table 1 may include description about a corresponding effect that is included in an effect set.

In some example embodiments, effects included in an effect set are described as effects for makeup, it is provided as an example only. Some example embodiments may include effects and effect sets other than makeup. Accordingly, the effects may include a set of preset effects among all the types of effects applicable to the image.

Figure 4:
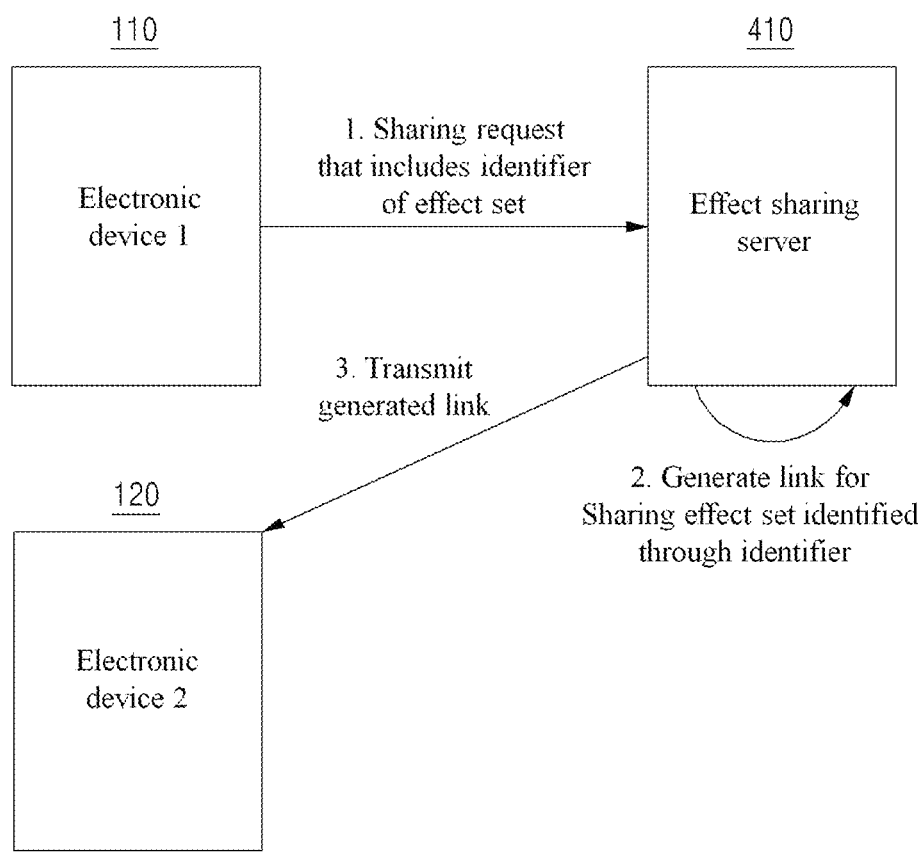
FIG. 4 illustrates an example of a process of sharing an effect set applied to an image according to at least one example embodiment.

As further shown in FIG. 4, a first image 311 displayed on the first screen 310 may be a preview image that is being input through a camera of an electronic device. In this case, the user may generate a picture file or a video image by capturing the first image 311 through an interface 313 for picture capturing and an interface 314 for video capturing. Depending on some example embodiments, the first image 311 may be an image that is displayed on a screen by loading a picture or video file stored in the electronic device.

In response to the user selecting "effect set 4" as one of effect sets that are provided through the user interface as shown in the first box 312, for example, in response to the user touching an interface region corresponding to "effect set 4" in a touchscreen environment, the first screen 310 may be replaced with the second screen 320 and a first image 321 to which the effect set 4 is applied may be displayed on the second screen 320. In this case, in response to the user selecting the interface 313 for picture capturing or the interface 314 for video capturing, a picture file or a video file to which the effect set 4 may be generated as the preview image.

When a first image 321 to which the effect set 4 is applied is displayed on the second screen 320 in response to the user selecting the effect set 4, a user interface 322, such as "share current effect" option, may be displayed for the user. When the user selects the user interface 322, such as a "share current effect" option, a process for sharing effect set 4 may be performed instead of sharing the picture or the video to which the effect set 4 is applied. In some example embodiments, an interface for sharing a current effect may be provided to the user using various forms, for example, additional options provided through a "more view" option or an additional option provided in response to a request for capturing a picture or a video, in addition to some example embodiments.

FIG. 4 illustrates a process of sharing an effect set applied to an image according to some example embodiments. As described above with reference to FIG. 3, the user of the electronic device (1) 110 may request sharing an effect set applied to a current image. The sharing request may be transmitted to an effect sharing server 410 by including an identifier of the corresponding effect set. For example, the effect sharing server 410 may be configured as the server 150 and a signal for the sharing request of the electronic device (1) 110 may be transmitted to the effect sharing server over the network 170. As used herein, "transmitting" includes sending, via a wired and/or wireless network, directly or indirectly, from a sending device (such as the effect sharing server) to a destination (such as the electronic device (1) 110.

In response to receiving the sharing request, an effect sharing server 410 may identify the effect set requested to be shared through the identifier included in the sharing request and may generate a link for sharing the identified effect set. For example, the generated link may be a link accessible to the effect sharing server 410 as a server uniform resource locator (URL) such as "http://looks.line.me/look?name=3ce_01". Also, the generated link may include an identifier for identifying an effect set, for example, "effect set 4" of FIG. 3, which is identified by an identifier such as "3ce_01".

As further shown in FIG. 4, a generated link may be transmitted to the electronic device (2) 120. The electronic device (2) 120 may access the effect sharing server 410 through the link and the effect sharing server 410 may immediately verify an effect set that the electronic device (2) 120 accessed through the link desires to share since the link is initially generated for sharing the corresponding specific effect set. An effect sharing server 410 may generate a control instruction for applying the corresponding effect set to an image of the electronic device (2) 120 and may transmit the generated control instruction to the electronic device (2) 120. For example, the control instruction may be a call instruction of an "App scheme URL," for an application that is installed and executed on the electronic device (2) 120, such as "looks://look?name=3ce_01". An example embodiment, such as an effect sharing server, may determine an accessing of a link by a second electronic device, and may send, to an electronic device such as the electronic device (1) 110 or the electronic device (2) 120, a control instruction for controlling another image editing logic of the second electronic device to apply the effect set to the image. An example embodiment, such as the electronic device (2) 120, may access an effect sharing through a link received from the effect sharing server, and may receive a control instruction from the effect sharing server in response to the accessing. For example, the electronic device (2) 120 may receive, from an effect sharing server, a control instruction to apply the effect set, and may apply the effect set to the image displayed on the screen in response to the control instruction. For example, in response to the control instruction, the application of the electronic device (2) 120 may select the effect set identified by the identifier "3ce_01" and may apply the selected effect set to an image displayed on a screen of the electronic device (2) 120, such that the effect set identified by the identifier "3ce_01" may be shared. That is, "effect set 4" selected and applied to the image by the electronic device (1) 110 in FIG. 3 may be applied alike to another image of the electronic device (2) 120.

The link generated through the effect sharing server 410 may be transmitted to the electronic device (2) 120 through various methods.

Figure 5:
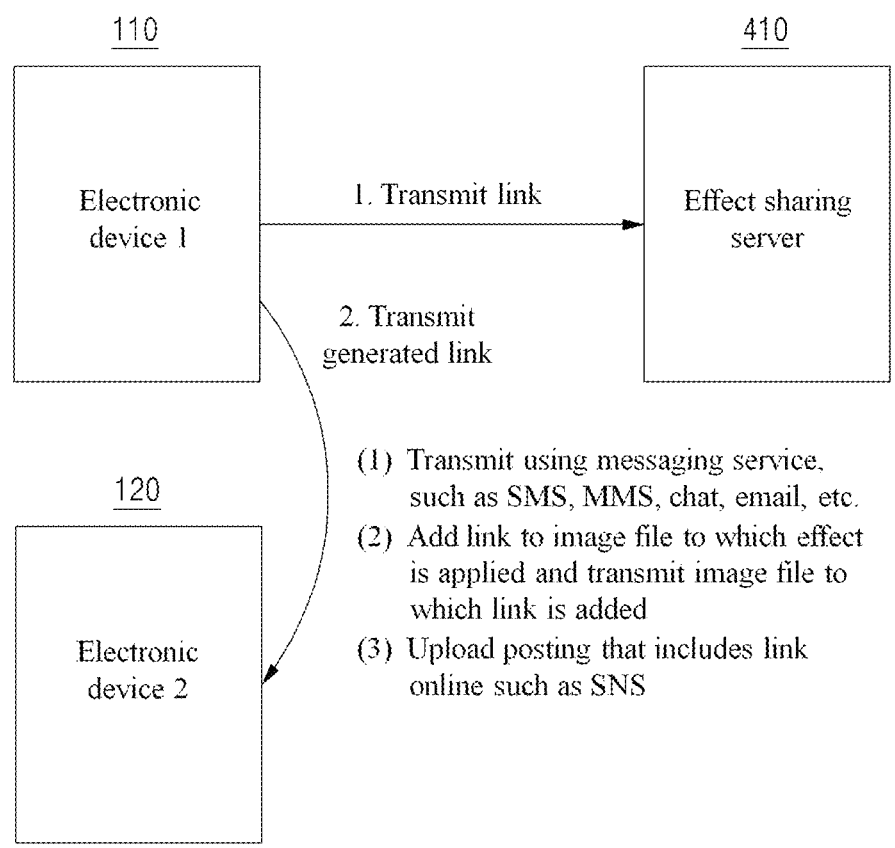
FIG. 5 illustrates an example of a link transmission process according to at least one example embodiment.

FIG. 5 illustrates an example of a link transmission process according to some example embodiments. In some example embodiments, an effect sharing server 410 may transmit a generated link to the electronic device (1) 110. In some example embodiments, the electronic device (1) 110 may receive the link and may transmit an effect set to the electronic device (2) 120 using a variety of methods. For example, an effect sharing server may send, to the electronic device (1) over a network, a link for sending through a messaging service to the electronic device (2) 120 identified by the first electronic device. Such messaging services may include, for example, a short message service (SMS), a multimedia message service (MMS), a chat service, and an email service. As an example, the electronic device (1) 110 may transmit the link to the electronic device (2) 120 by executing an instant messaging application, by selecting a user of the electronic device (2) 120 as a user having a relationship in a messaging service, and by transmitting a message including the link to the selected user.

As another example, an effect sharing server may send a link to the electronic device (2) 120 through an identifier of a sharing target included in the sharing request, such as a phone number, email address, and/or network address of the electronic device (2) 120.

As another example, an effect sharing server may send the image to which the effect set is applied, where the image includes the link to the effect set. For example, the electronic device (1) 110 may add the generated link to the first image 321 of FIG. 3 to which the effect set 4 is applied and may transmit an image file to which the link is added to the electronic device (2) 120. In this case, the image file to which the link is added may be transmitted using one of any type of services capable of transmitting a picture file or a video file, including at least one of the aforementioned messaging services or a data transmission protocol using near field radio communication such as Bluetooth.

As another example, an effect sharing server may send a link as an online posting that the electronic device (1) 110 and/or the electronic device (2) 120 may receive. For example, the electronic device (1) 110 may upload, online, for example, to an SNS or a blog, a posting that includes a link. In this case, the electronic device (2) 120 may acquire the link for sharing the specific effect set by accessing the posting that includes the link.

Figure 6:
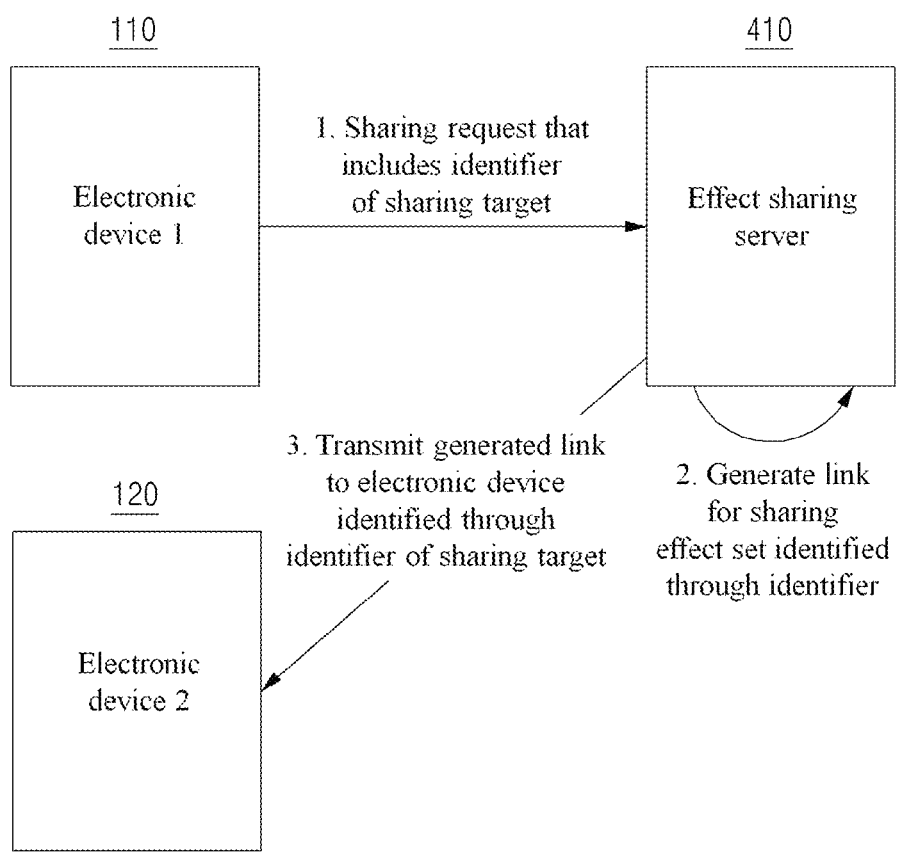
FIG. 6 illustrates another example of a link transmission process according to at least one example embodiment.

FIG. 6 illustrates a link transmission process according to at least one example embodiment. In some example embodiments, a sharing request of the electronic device (1) 110 may further include an identifier of a sharing target in addition to an identifier of an effect set. In this case, in response to the sharing request, the effect sharing server 410 may generate a link for sharing the corresponding effect set. Also, the effect sharing server 410 may transmit the generated link to an electronic device, for example, the electronic device (2) 120 in some example embodiments, identified using the identifier of the sharing target included in the sharing request. In this manner, the link may be transmitted to the user desired by the user of the electronic device (1) 110 and the specific effect set may be shared. For example, the identifier of the sharing target may be a telephone number and an email address of the user of the electronic device (2) 120, and a messenger account identifier for a specific messenger service. When the identifier of the sharing target is a messenger account identifier, the corresponding specific messenger service may be a service linked with a service of the effect sharing server 410.

As another example, the effect sharing server 410 may upload a posting that includes the generated link online so that electronic devices may share the specific effect set, or may immediately upload the posting that includes the generated link directly to an SNS account of the user of the electronic device (1) 110.

Although some example embodiments in which the electronic device (1) 110 and the electronic device (2) 120 share the effect set are described, the effect set may be shared in such a manner that a single electronic device or the effect sharing server 410 transmits the link to the plurality of electronic devices. Also, in some example embodiments, uploading the posting that includes the link only may achieve the effect of sharing the effect set by transmitting the link to a plurality of unspecific electronic devices.

Figure 7:
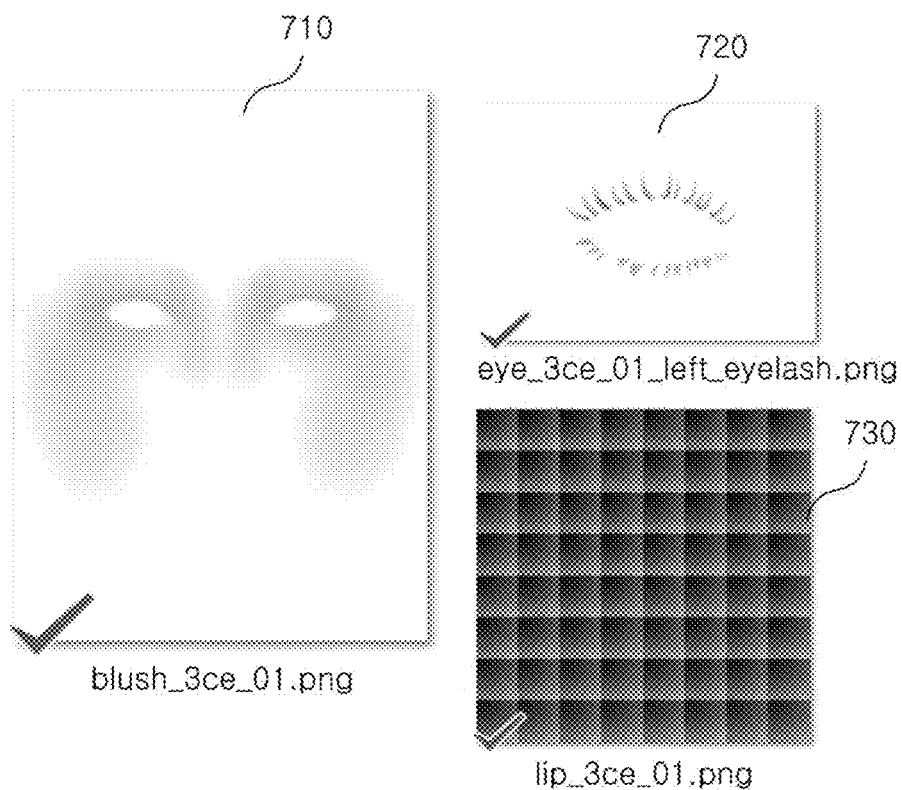
FIG. 7 illustrates an example of components of an effect set identified through a specific identifier according to at least one example embodiment.

FIG. 7 illustrates an example of components of an effect set identified through a specific identifier according to at least one example embodiment, wherein an effect sharing method includes receiving a sharing request including an identifier of an effect set; generating a control instruction for applying the effect set; and sending the control instruction to an electronic device in response to the sharing request. FIG. 7 illustrates files for a portion of components of the effect set identified by the aforementioned identifier "3ce_01". The application of the electronic device (2) 120 may control the electronic device (2) 120 to access the effect sharing server 410 through a link that is generated by and transmitted from the effect sharing server 410. Also, the application may be configured to select components of the effect set including files 710, 720, and 730 of FIG. 7 in response to a control instruction provided from the effect sharing server 410 and to apply the selected components to an image that is displayed on a screen of the electronic device (2) 120. The first file 710 "blush_3ce_01.png" may be a file for applying a blush effect among the components of Table 1 to the image. Also, the second file 720 "eye_3ce_01_left_eyelash.png" may be a file for applying a left eye eyelash effect among the components of Table 1 to the image. Also, the third field 730 "lip_3ce_01.png" may be a lookup table (LUT) for applying a lipstick effect among the components of Table 1 to the image.

Figure 8:
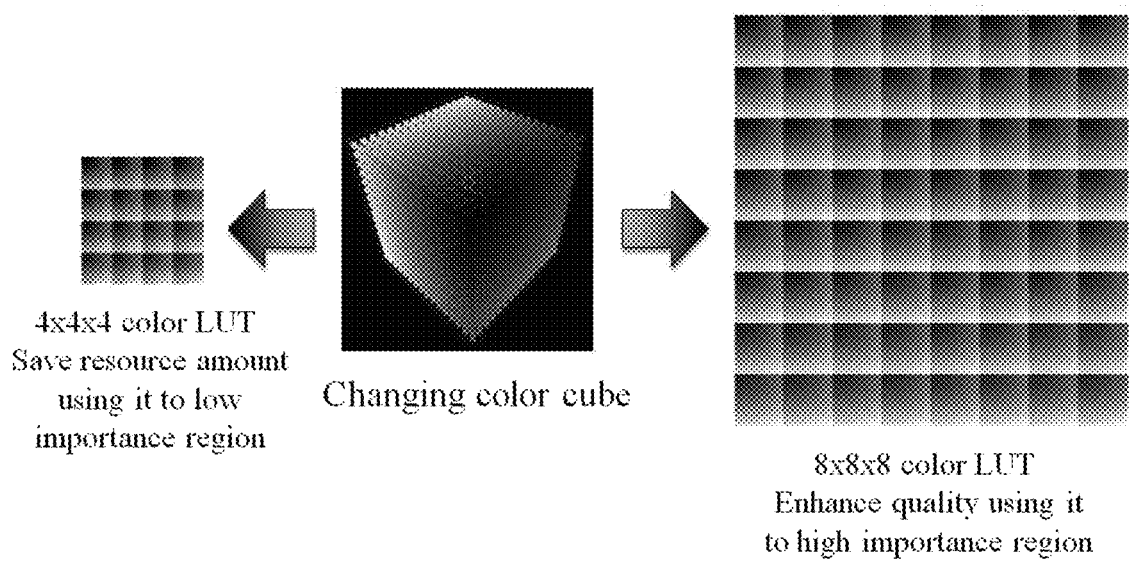
FIG. 8 illustrates an example of a lookup table according to at least one example embodiment.

FIG. 8 illustrates an example of a lookup table according to at least one example embodiment. The lookup table (LUT) may be a conversion table that one-to-one (1:1) replaces an original color with an output color. Lookup tables with various sizes may be generated in advance under a condition (e.g., a desired condition), for example, based on a specific product and provided to an application according to examples. The lookup tables may be applied in differential sizes depending on importance of a region to be applied. For example, referring to FIG. 8, an amount of resources to be used may be reduced by applying a lookup table (LUT) with 4×4×4 colors to a relatively low importance region. Also, quality of a result image may be enhanced by applying a lookup table (LUT) with 8×8×8 colors to a relatively high importance region. For example, in the case of applying a lookup table to a lip region to apply a lipstick effect, the lip region may be divided into subregions and lookup tables with different sizes may be applied for the respective subregions.

Figure 9:
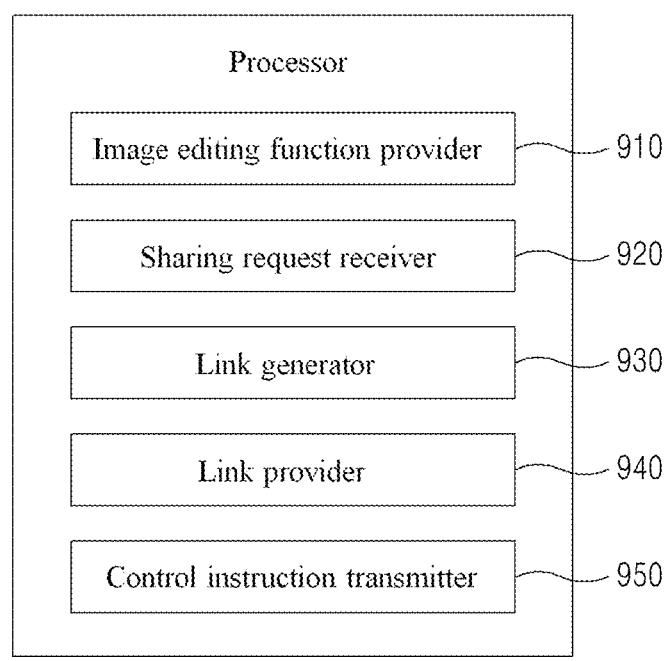
FIG. 9 illustrates an example of components includable in a processor of a server according to at least one example embodiment.
Figure 10:
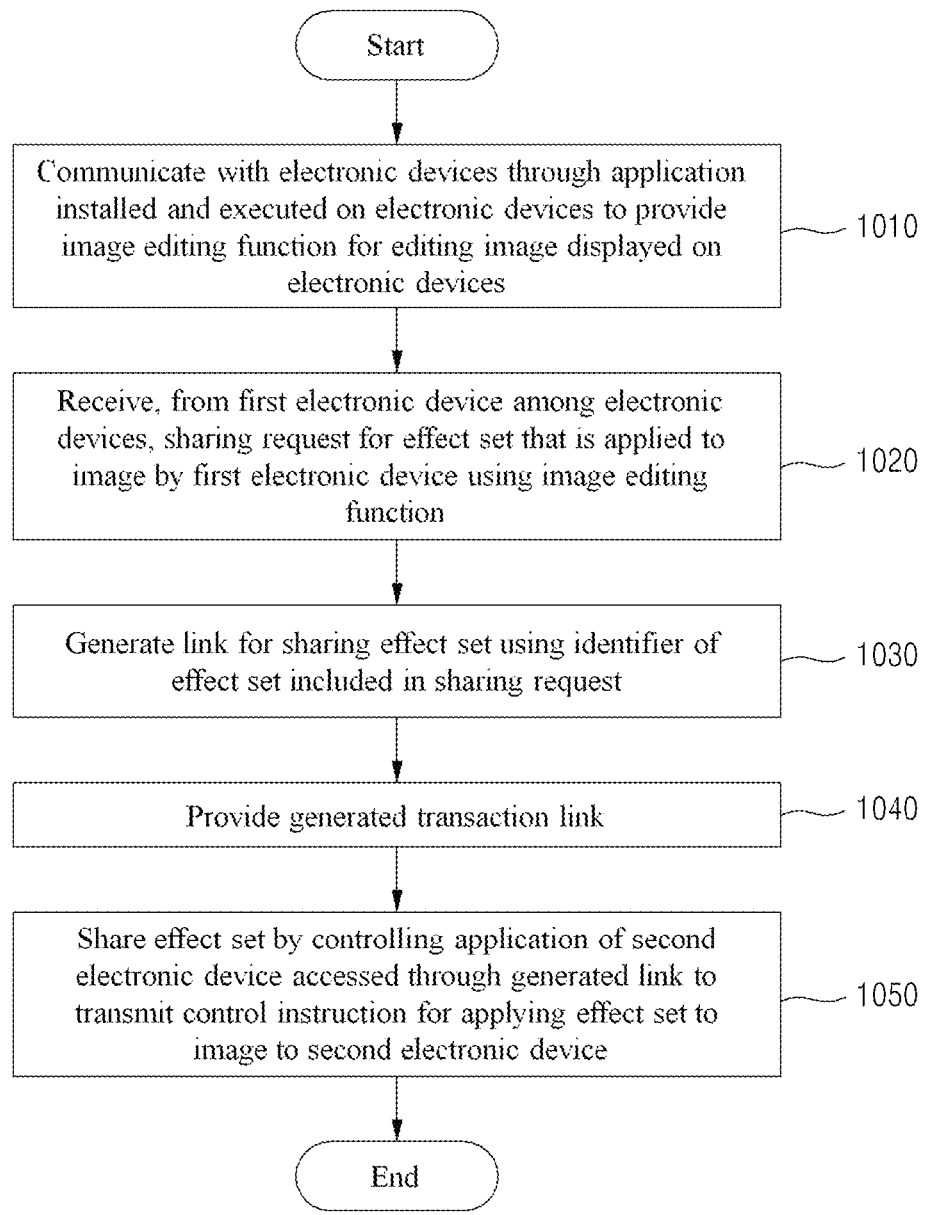
FIG. 10 is a flowchart illustrating an example of an effect sharing method performed by a server according to at least one example embodiment.

FIG. 9 illustrates an example of components includable in a processor of a server according to at least one example embodiment, and FIG. 10 is a flowchart illustrating an example of an effect sharing method performed by a server according to at least one example embodiment.

FIG. 9 illustrates the processor 222 of a server 150 in an example embodiment. A server 150 may be a device that implements the effect sharing server 710. Referring to FIG. 9, the processor 222 may include an image editing provider 910, a sharing request receiver 920, a link generator 930, a link provider 940, and/or a control instruction transmitter 950. The processor 222 may perform operations 1010 to 1050 included in the example effect sharing method of FIG. 10. The processor 222 may be configured to execute an instruction according to a code of at least one computer program or a code of an OS included in the memory 221. The processor 222 may include representations of different functionality that is performed in response to the control instruction provided from the code stored in the server 150. For example, the sharing request receiver 920 may control the server 150 to receive a sharing request in response to the control instruction.

Referring to FIG. 10, in operation 1010, the image editing provider 1010 may communicate with electronic devices through an application installed and executed on the electronic devices to provide an image editing logic for editing an image displayed on the electronic devices. The server 150 may provide a service for editing an image to the electronic devices on which the application is basically installed and executed. For example, the server 150 may provide a service that applies preset effects, for example, effect set to the displayed image. The application that is basically installed and executed on the electronic device may include an image editing logic for controlling the corresponding electronic device to apply various effects on the image displayed on the screen of the electronic device. When data required to provide the image editing logic is stored in the electronic device, the effects may be provided to the image based on the data stored in the electronic device. Data not stored in the electronic device may be downloaded and processed through the server 150.

In operation 1020, the sharing request receiver 920 may receive, from a first electronic device among the electronic devices, a sharing request for an effect set that is applied to an image by the first electronic device using the image editing logic. For example, the first electronic device may correspond to the electronic device (1) 110. For example, the user of the first electronic device may request sharing of a desired effect set while applying the provided effect sets to the image. For example, the user of the first electronic device may transmit the sharing request to the server 150 using the user interface 322, for example, "share current effect" of FIG. 3. In this case, the sharing request receiver 920 may receive the sharing request from the first electronic device. For example, a sharing request may include an identifier of the effect set that is applied to the image.

In operation 1030, the link generator 930 may generate a link for sharing the effect set using the identifier of the effect set included in the sharing request. As described above, the link may be generated to include functionality of contacting the server 150 in association with a specific effect set.

In operation 1040, the link provider 940 may provide the generated link. For example, the link provider 940 may transmit the generated link to the first electronic device over a network. A link transmitted to the first electronic device may be further transmitted to a second electronic device identified by the first electronic device through a messaging service, may be included in the image to which the effect set is applied by the first electronic device and thereby transmitted to the second electronic device with the image to which the effect set is applied, or may be transmitted to the second electronic device through a posting that is uploaded online through the first electronic device. As another example, the link provider 940 may transmit the generated link to the second electronic device identified by an identifier of a sharing target further included in the sharing request or may upload a posting that includes the generated link online.

In operation 1050, the control instruction transmitter 950 may share the effect set by controlling the application of the second electronic device accessed through the generated link to transmit a control instruction for applying the effect set to the image to the second electronic device.

The application installed on the electronic devices may control the corresponding electronic device to execute a camera of the electronic device on which the application is installed and executed, to apply an effect set selected from among a plurality of effect sets using the image editing logic to an input image that is received through the camera, and to transmit a sharing request for the applied effect set to an effect sharing server. Also, the application may control the corresponding electronic device to access the effect sharing server through a link generated by the effect sharing server, to receive the control instruction provided from the effect sharing server through the generated link, and to apply an effect set identified by the control instruction to the input image received through the camera. In detail, the application may control the corresponding electronic device to recognize (and, optionally, to analyze) a facial region in the input image received through the camera, and to apply makeup effects including the effect set to the facial region. For example, in response to a sharing request for sharing makeup effects applied to a facial image of the user of the first electronic device, the effect sharing server may generate and provide a link for applying a set of the corresponding makeup effects, the second electronic device may share the same makeup effects through the provided link, and the same makeup effects may be automatically applied to a facial image of a user of the second electronic device.

Figure 11:
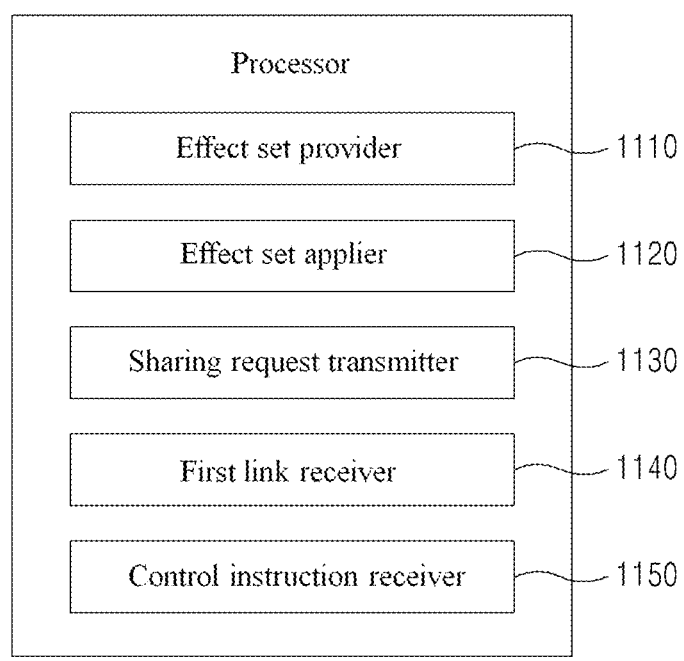
FIG. 11 illustrates an example of components includable in a processor of an electronic device according to at least one example embodiment.
Figure 12:
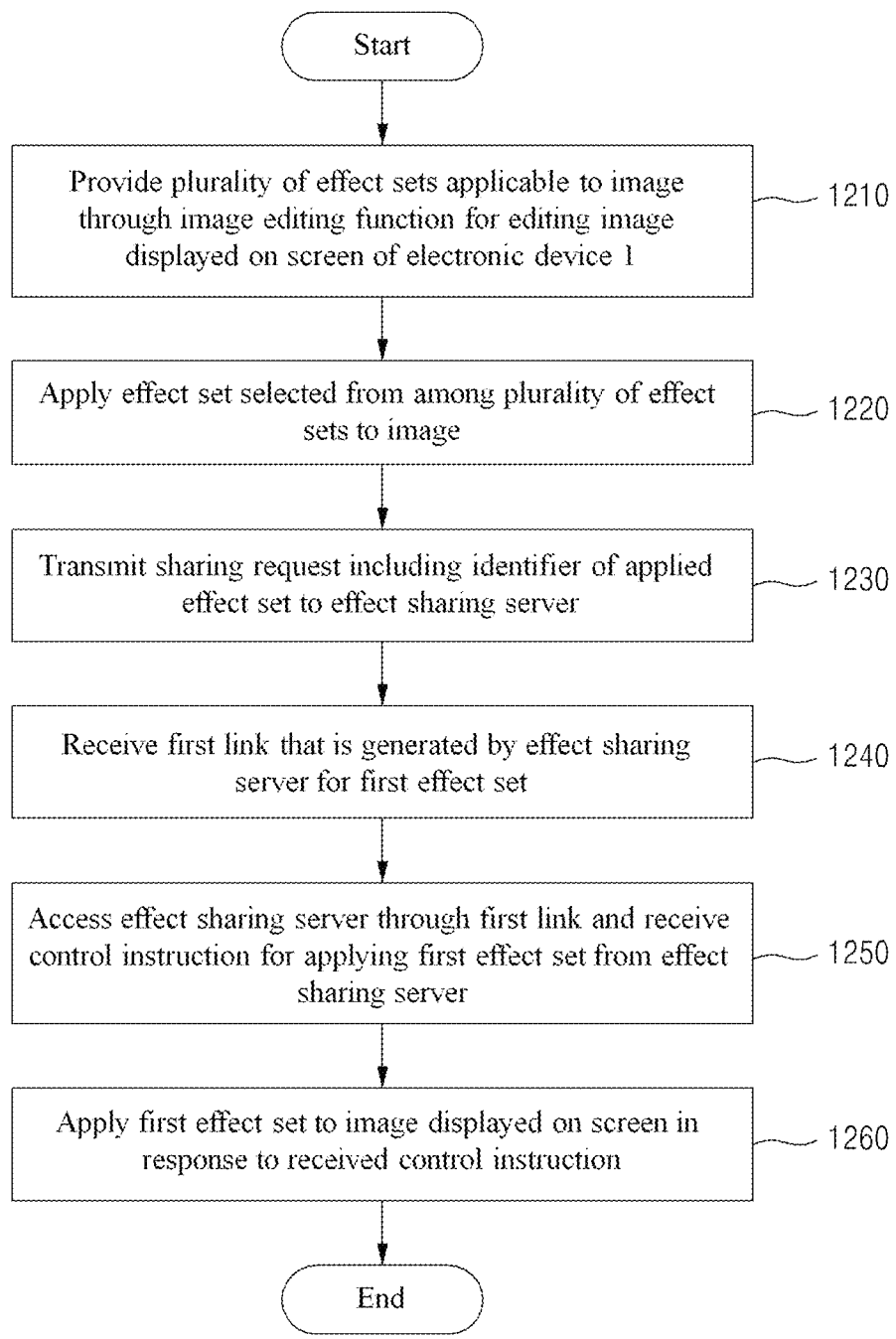
FIG. 12 is a flowchart illustrating an example of an effect sharing method performed by an electronic device according to at least one example embodiment.

FIG. 11 illustrates an example of components includable in a processor of an electronic device according to at least one example embodiment, and FIG. 12 is a flowchart illustrating an example of an effect sharing method performed by an electronic device according to at least one example embodiment.

FIG. 11 illustrates the processor 212 of an electronic device (1) 110 in an example embodiment. Referring to FIG. 11, the processor 212 may include an effect set provider 1110, an effect set applier 1120, a sharing request transmitter 1130, a link receiver 1140, and/or a control instruction receiver 1150. The processor 212 may be configured to perform operations 1210 to 1260 included in the effect sharing method of FIG. 12. The processor 212 may be configured to execute an instruction according to a code of at least one computer program or a code of the OS included in the memory 212. A processor 212 may include representations of different functionality that is performed in response to a control instruction provided from the code stored in the electronic device (1) 110. For example, the effect set provider 1110 may be used as a functional representation of the processor 212 that is configured to control the electronic device (1) 110 to provide an effect set in response to the control instruction.

Referring to FIG. 12, in operation 1210, the effect set provider 1110 may provide a plurality of effect sets applicable to an image through an image editing logic for editing the image displayed on a screen of the electronic device (1) 110. The image editing logic may be provided under control of an application installed on the electronic device (1) 110 and/or through interaction between the application and an effect sharing server, and each of the effect sets may o include preset at least one effect.

In operation 1220, the effect set applier 1120 may apply an effect set selected from among the plurality of effect sets to the image. The image editing logic provided through the application may provide a user interface of selecting the plurality of effect sets to the user of the electronic device (1) 110, and the user may select a desired effect set through the provided user interface. In this case, the effect set applier 1120 may apply the effect set selected by the user to the image.

In operation 1230, the sharing request transmitter 1130 may transmit a sharing request including an identifier of the applied effect set to the effect sharing server. In response to an input from the user for effect sharing through the user interface of sharing the effect set applied to the current image, the sharing request transmitter 1130 may generate the sharing request to include the identifier of the effect set applied to the image and may transmit the generated sharing request to the effect sharing server over a network, for example, the network 170 of FIG. 1

As described above, in response to receiving the sharing request, the effect sharing server may identify the effect set to be shared through the identifier included in the sharing request, and may generate and provide a link for sharing the identified effect set.

In operation 1240, the link receiver 1140 may receive a first link that is generated by the effect sharing server for a first effect set. A first effect set may be a link that is generated by the effect sharing server in response to the sharing request from the electronic device (1) 110 or another electronic device and may be provided to the electronic device (1) 110 through various paths.

In operation 1250, the control instruction receiver 1150 may access the effect sharing server through the first link and may receive a control instruction for applying the first effect set from the effect sharing server. For example, the control instruction receiver 1150 may display the received first link on the screen of the electronic device (1) 110 and may access the effect sharing server through the first link by recognizing a selection of the user on the displayed first link, for example, a touch of the user using a finger a region on which the first link is displayed in a touch screen environment. Since the first link is generated to share the first effect set, the effect sharing server may immediately identify the first effect set as the effect set that the electronic device (1) 110 accessed through the first link desires to share. As described above, a resource indicator included in the generated link may be generated including an identifier desired to be shared, such as, for example, server URL "http://looks.line.me/look?name=3ce_01". The effect sharing server may generate a control instruction for controlling the application installed and executed on the electronic device (1) 110 to apply the identified first effect set to the image and may transmit the generated control instruction to the electronic device (1) 110.

In operation 1260, the effect set applier 1120 may apply the first effect set to the image displayed on the screen in response to the received control instruction. The received control instruction may be a call instruction of "App scheme URL," for an application that is installed and executed on the electronic device (2) 120, such as, for example, "looks://look?name=3ce_01". Since the control instruction includes the identifier of the effect set, the effect set applier 1120 may recognize and select the first effect set based on logic of the application called in response to the control instruction and may apply the selected first effect set on the image that is currently displayed on the screen.

Some example embodiments may relate to technology for sharing an effect set applied by a first electronic device with a second electronic device. In some example embodiments, an effect set may be shared by receiving another image to which the effect set is applied as a parameter and extracting the identifier of the effect set from the parameter of the another image. For example, a user of the second electronic device that desires to share the effect set may endeavor to use an effect set applied to a specific image. An identifier of the specific effect set may be added to a parameter of the image applied to the specific effect set. In this case, the second electronic device may receive the another image to which the effect set has been applied and that includes the link or the identifier. The second electronic device may extract the link or the identifier of the effect set from the image, and may apply the effect set to still another image based on the link or the extracted identifier.

Figure 13:
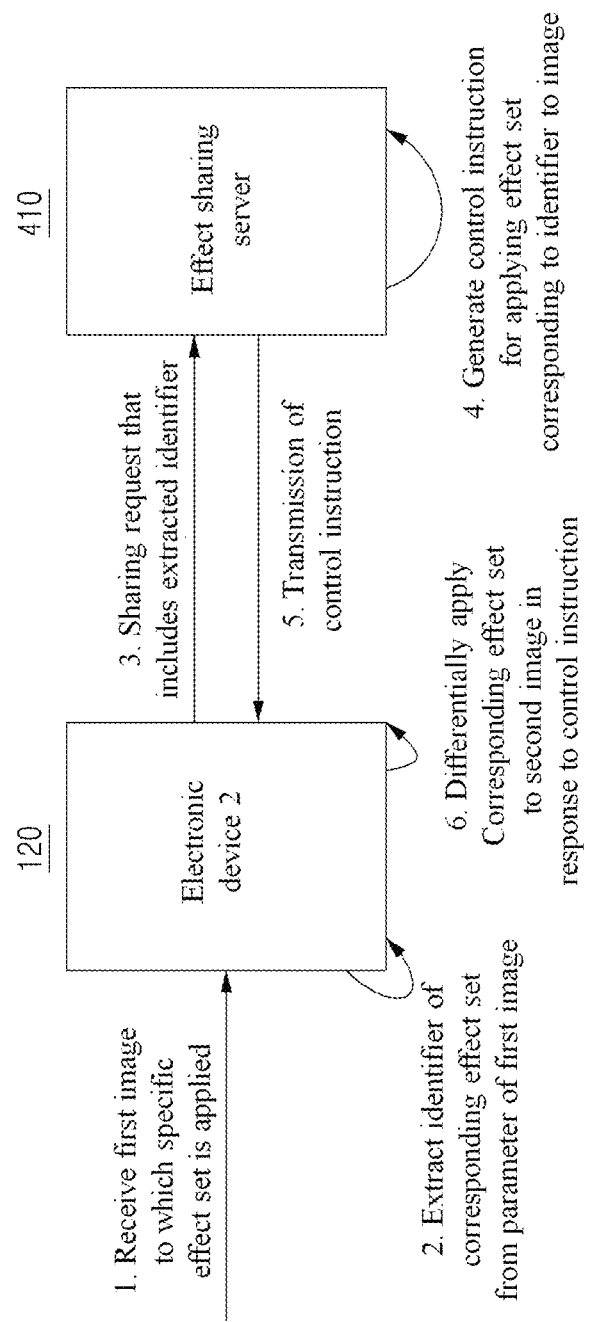
FIG. 13 illustrates an example of sharing an effect set applied to an image according to at least one example embodiment.

FIG. 13 illustrates an example of sharing an effect set applied to an image according to at least one example embodiment.

The electronic device (1) 110 may receive a first image to which a specific effect set is applied. In some example embodiments, the first image may refer to an image generated by applying, at another electronic device, the effect set, and the electronic device (1) 110 may receive the first image through a messaging service an online posting that is uploaded online and that includes the link, or may receive the link from an effect sharing server. As described above, when the effect set is applied to the image, the effect set of the image may be added to a parameter of the image.

The electronic device (1) 110 may extract the identifier of the effect set that is applied to the first image from the parameter of the received first image, may generate a sharing request that includes the extracted identifier, and may transmit the generated sharing request to the effect sharing server 410.

The effect sharing server 410 may verify the identifier included in the sharing request, may generate a control instruction for applying the effect set corresponding to the verified identifier to the image, and may transmit the generated control instruction to the electronic device (1) 110.

Figure 14:
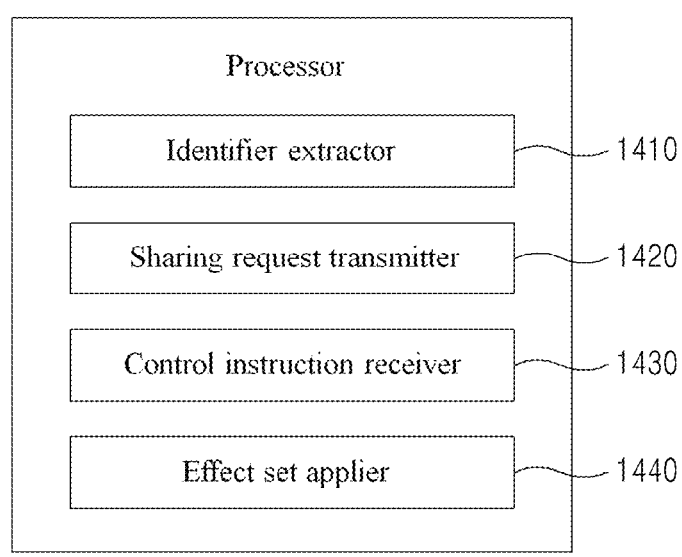
FIG. 14 illustrates another example of components includable in a processor of an electronic device according to at least one example embodiment.

An electronic device (1) 110 may apply the corresponding effect set to a second image in response to the received control instruction. For example, the second image refers to an image to which the user of the electronic device (1) 110 desires to apply the corresponding effect set. The second image may be a picture or a video stored in the electronic device (1) 110 and may be a preview input image received through the camera of the electronic device (1) 110. FIG. 14 illustrates another example of components includable in a processor of an electronic device according to at least one example embodiment, and FIG. 15 is a flowchart illustrating another example of an effect sharing method performed by an electronic device according to at least one example embodiment.

FIG. 14 illustrates the processor 212 of the electronic device (1) 110 of an example embodiment. Referring to FIG. 14, the processor 212 may include an identifier extractor 1410, a sharing request transmitter 1420, a control instruction receiver 1430, and/or an effect set applier 1440. In an example embodiment, the processor 212 may be configured to perform operations 1510 to 1540 included in the effect sharing method of FIG. 15. The processor 212 may be configured to execute an instruction according to a code of at least one computer program or a code of the OS included in the memory 212. The processor 212 may include representations of different functionality that is performed in response to a control instruction provided from the code stored in the electronic device (1) 110.

Figure 15:
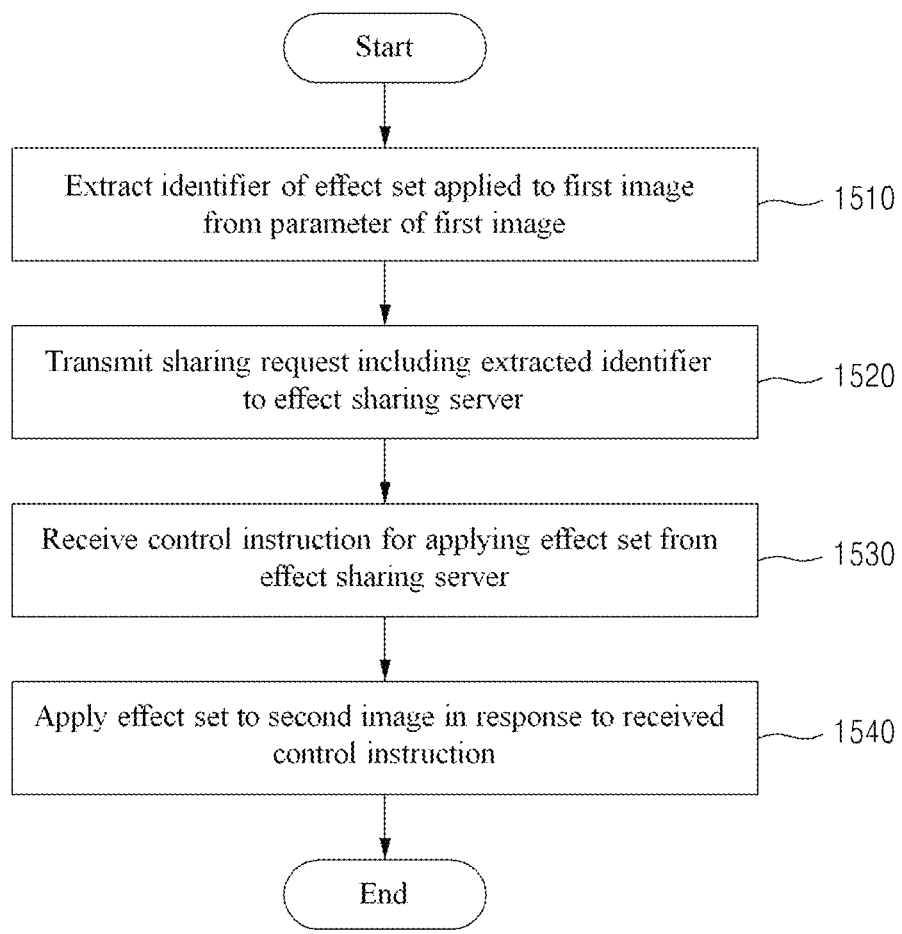
FIG. 15 is a flowchart illustrating another example of an effect sharing method performed by an electronic device according to at least one example embodiment.

Referring to FIG. 15, in operation 1510, the identifier extractor 1410 may extract an identifier of an effect set applied to a first image from a parameter of the first image. As described above, the first image may refer to an image to which a set of specific effects is applied and the electronic device (1) 110 may directly receive the first image from another electronic device having generated the first image or may receive the first image through an effect sharing server or an online posting. When the first image is generated at the other electronic device, the identifier of the effect set applied to the first image may be included in the parameter of the first image. In this case, the identifier extractor 1410 may extract the identifier of the effect set applied to the first image from the parameter of the first image.

In operation 1520, the sharing request transmitter 1420 may transmit a sharing request including the extracted identifier to the effect sharing server. Herein, the sharing request may be a request for sharing the effect set applied to the first image with the electronic device (1) 110, the sharing request may differ from the sharing request for sharing the effect set with other users described above with some example embodiments. For example, the sharing request according to some of the presently example embodiments may be to request the effect sharing server for a control instruction for applying an effect set corresponding to an identifier included in the sharing request. The effect sharing server may generate the control instruction for applying the effect set identified through the identifier included in the sharing request to the image and may transmit the generated control instruction to the electronic device (1) 110.

In operation 1530, the control instruction receiver 1430 may receive the control instruction for applying the effect set from the effect sharing server. As described above, the control instruction may be an instruction for executing an application interacting with the effect sharing server and controlling the application to apply the identified effect set to the input image received through the camera. As another example, in response to execution of the application and a selection on a specific image through the application, the control instruction may be an instruction for controlling the application to apply the identified effect set to the specific image.

In operation 1540, the effect set applier 1440 may apply the effect set to a second image in response to the received control instruction. As described above, the first image may include an image received over a network, and the second image may include an input image received through the camera of the electronic device (1) 110. However, in some example embodiments, the second image may be an image selected from among images stored in the electronic device (1) 110 under control of the application that is installed and executed on the electronic device (1) 110.

The control instruction described in some example embodiments may include network address information of a resource for an effect included in an effect set. For example, the control instruction may include address information as a component of the effect set, which is described above with reference to FIG. 7. Example embodiments may include sending the control instruction and the network address information to an electronic device in response to the sharing request. The application installed and executed on electronic devices may receive files for applying the effect based on the address information and may apply the effect corresponding to the received files to an image.

According to example embodiments in which users share an effect set, a first electronic device may share an effect set including effects corresponding to a condition selected or input from the first electronic device with a second electronic device, instead of sharing an effect set applied to an image by the first electronic device. For example, an effect provided in relation to a specific cosmetic, lipstick A, may include "pink color" only. The application may provide a user interface of designating or selecting a condition for each component of an effect set through the first electronic device. A user of the first electronic device may select a lipstick effect from among the components of the effect set using the user interface and may designate or select a condition for a color as "red".

The designated or selected condition, for example, a condition that requires a red lipstick effect such as "lip_red," may be included in the sharing request in association with an identifier of the effect set as a single parameter, and the sharing request that includes the condition and the identifier may be transmitted to the effect sharing server. In this case, the effect sharing server may identify the effect set through the identifier included in the sharing request and may generate the red lipstick effect to meet the aforementioned condition of the identified effect set. For example, a file for the red lipstick effect may be generated. In this case, a control instruction provided from the effect sharing server may be generated to include address information of the file for the red lipstick effect instead of including a file that includes the pink lipstick effect.

A condition for an individual component included in the effect set or the entire components included in the effect set may be set based on the designated or selected condition and may be used to change the effect set.

Figure 16:
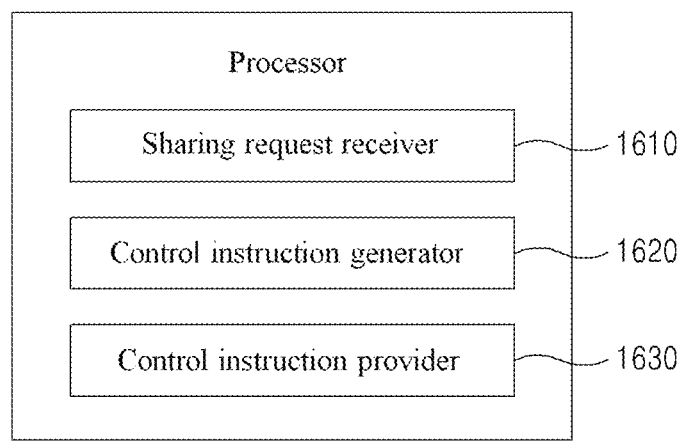
FIG. 16 illustrates another example of components includable in a processor of a server according to at least one example embodiment.
Figure 17:
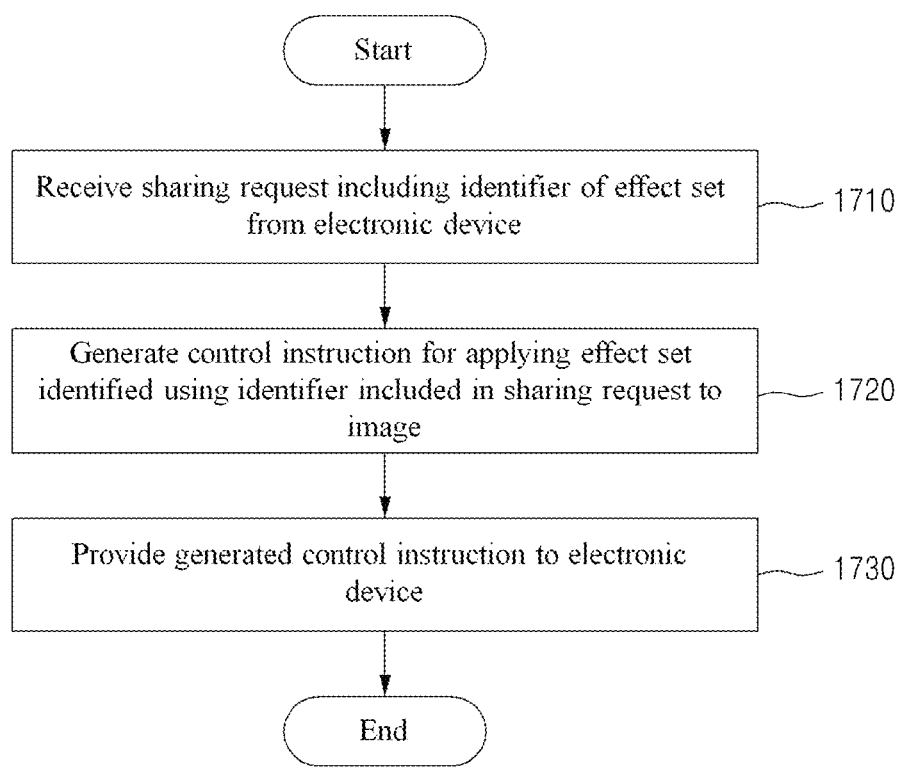
FIG. 17 is a flowchart illustrating another example of an effect sharing method performed by a server according to at least one example embodiment.

FIG. 16 illustrates another example of components includable in a processor of a server according to at least one example embodiment, and FIG. 17 is a flowchart illustrating another example of an effect sharing method performed by a server according to at least one example embodiment.

FIG. 16 illustrates a processor 222 of a server 150 in an example embodiment. Referring to FIG. 16, the processor 222 may include a sharing request receiver 1610, a control instruction generator 1620, and/or a control instruction provider 1630. The processor 222 may be configured to perform operations 1710 to 1730 included in the effect sharing method of FIG. 10. The processor 222 may be configured to execute an instruction according to a code of at least one computer program or a code of the OS included in the memory 221. The components of the processor 222 may be representations of different functionality that is performed in response to a control instruction provided from the code stored in the server 150.

Referring to FIG. 17, in operation 1710, the sharing request receiver 1610 may receive a sharing request including an identifier of an effect set from an electronic device. The identifier of the effect set may be included in a parameter of another image to which the effect set is applied and provided to the electronic device. For example, the electronic device may extract the identifier from the parameter of the other image and may generate a sharing request under control of an application that is installed and executed on the electronic device.

In operation 1720, the control instruction generator 1620 may generate a control instruction for applying the effect set identified using the identifier included in the sharing request to the image. The control instruction may be generated to include network address information of a resource for each of effects included in the identified effect set. In some example embodiments, where a sharing request includes a condition of the effect wherein the resource for the effect including the condition does not exist, the generating of the control instruction may include generating the resource for the effect including the condition and the network address information of the resource.

In some example embodiments, the sharing request may further include a condition for at least one of the effects included in the effect set. In this case, in response to an absence of the resource for the effect corresponding to the condition, the control instruction generator 1620 may generate a control instruction for generating a resource for the effect corresponding to the condition and including address information of the generated resource. The condition may include an adjustment of one of a color of the effect, a size of the effect, an application level of a lookup table, or a second image that is generated for the effect. The image or the lookup table is described above with reference to FIGS. 7 and 8. Also, address information of the resource for the effect may include a URL of the adjustment, which may enable an electronic device to access the image or the lookup table to share the effect or effect set and/or to apply the effect or effect set to an image.

In operation 1730, the control instruction provider 1630 may provide the generated control instruction to the electronic device. The application installed and executed on the electronic device may control the electronic device to apply the effect set to an image displayed on a screen of the electronic device in response to the control instruction. That is, when a sharing request of an effect set applied to a specific image through an identifier of the effect set is transmitted to the server 150 under control of the application, the electronic device may apply the effect set to the image displayed on the screen of the electronic device in response to the control instruction from the server 150. For example, the user may apply the same effects to desired another image using an identifier extracted from an image to which the desired effects are applied. The application may acquire a resource for each of the effects included in the effect set based on the address information included in the control instruction and may apply the corresponding effect set to the image displayed on the screen of the electronic device using the resource.

Some example embodiments may include generating and sending a link for sharing an effect set applied to an image in response to a sharing request for the effect set applied to the image by an electronic device to share an effect applied to the image instead of sharing the image to which the effect is applied. In some example embodiments, in response to an electronic device being provided with the link and accessing an effect sharing server through the link, an effect sharing server may send to the electronic device a control instruction for applying an effect set corresponding to the link to an image of the corresponding electronic device. Accordingly, the user may share the effect set selected by the user with a friend of the user or unspecific users instead of sharing the image to which the effect is applied. Also, it is possible to acquire an identifier of an effect set through an image to which the effect set is applied, and to apply the same or similar effect set to another image using the acquired identifier of the effect set.

Some example embodiments described herein may be implemented using hardware components, software components, and/or a combination thereof. For example, some example embodiments may be implemented using hardware including logic circuits; a hardware/software combination, such as a processor executing software; or a combination thereof. For example, a processor may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

A processing device may include an operating system (OS) and one or more software applications that run on or within the OS. A processing device may be configured to access, store, manipulate, process, and/or create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

In some example embodiments, the processing device may include a computer program, a piece of code, an instruction, or some combination thereof, for independently or collectively instructing or configuring the processing device to operate as desired. In some example embodiments, the processing device may include software and/or data may be embodied permanently or temporarily in any type of machine, component, physical or virtual equipment, computer storage medium or device, or in a propagated signal wave capable of providing instructions or data to or being interpreted by the processing device. In some example embodiments, the processing device may include software that is distributed over network coupled computer systems so that the software is stored and executed in a distributed fashion. In some example embodiments, the processing device may be stored by one or more computer-readable storage media.

Some example embodiments may be recorded in non-transitory computer-readable media, including program instructions to implement various operations of some of the above-described example embodiments. The media may also include, alone or in combination with the program instructions, data files, data structures, and the like. The program instructions recorded on the media may be those specially designed and constructed for use with some example embodiments, or they may be of the kind well-known and available to those having skill in the computer software arts. Examples of non-transitory computer-readable media include magnetic media such as hard disks, floppy disks, and magnetic tapes; optical media such as CD-ROM discs and DVDs; magneto-optical media such as floptical disks; and hardware devices that are specially configured to store and perform program instructions, such as read-only memory (ROM), random access memory (RAM), flash memory, and the like. In some example embodiments, program instructions may include machine code, such as produced by a compiler, and/or files containing higher-level code that may be executed by the computer using an interpreter. The above-described devices may be configured to act as one or more software modules in order to perform the operations of the above-described example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

As used herein, terms such as "when" and "while" may, but are not necessarily intended to, imply a chronological relationship such as a sequence of events. For example, operations that are described as occurring "when" or "while" a condition is fulfilled may be performed concurrently with the fulfillment of the condition, or during the fulfillment of the condition, or after the fulfillment of the condition, or because the condition is fulfilled or has been fulfilled, etc. Similarly, phrases such as "on condition of" that associate an operation with a condition may indicate that the operation is performed concurrently with the fulfillment of the condition, or during the fulfillment of the condition, or after the fulfillment of the condition, or because the condition is fulfilled or has been fulfilled, etc. All such interpretations that are reasonably and logically possible, and that are not contradictory with other statements, are intended to be included in this disclosure, the scope of which is to be understood as being limited only by the claims.

What is claimed is:

1. An effect sharing method comprising:
   receiving, from a first electronic device, a first sharing request for an effect set that is applied to a first image by a first image editing logic of the first electronic device, wherein the first sharing request includes an identifier of the effect set and an identifier of a second electronic device;
   generating a link for sharing the effect set;
   sending the link in response to the first sharing request;
   receiving, from the second electronic device, a second sharing request based on selection of the link; and
   causing a second image editing logic of the second electronic device to apply the effect set to a second image by sending a control instruction to the second electronic device in response to the receiving the second sharing request, the control instruction corresponding to an application-specific uniform resource locator scheme,
   wherein the control instruction includes first network address information and second network address information, the first network address information corresponding to a first resource for a first effect included in the effect set, and the second network address information corresponding to a second resource for a second effect in the effect set.

2. The effect sharing method of claim 1, wherein sending the link includes one of,
   sending, to the first electronic device over a network, the link for sending through a messaging service to the second electronic device,
   sending the link to the second electronic device through an identifier of a sharing target included in the first sharing request, or
   sending the link as an online posting.

3. The effect sharing method of claim 1, wherein the sending the link includes sending the first image to which the effect set is applied and that includes the link.

4. An effect sharing method comprising:
   receiving a sharing request including an identifier of an effect set;
   generating a control instruction for applying the effect set; and
   sending the control instruction to an electronic device in response to the sharing request, the control instruction including a call instruction of an application installed on the electronic device, the call instruction corresponding to a uniform resource locator scheme specific to the application,
   wherein the control instruction includes first network address information and second network address information, the first network address information corresponding to a first resource for a first effect included in the effect set, and the second network address information corresponding to a second resource for a second effect in the effect set.

5. The effect sharing method of claim 4, further comprising:
   receiving an image to which the effect set is applied as a parameter; and
   extracting the identifier from the parameter of the image.

6. The effect sharing method of claim 4, wherein sending the control instruction includes sending the control instruction, the first network address information and the second network address information to the electronic device in response to the sharing request.

7. The effect sharing method of claim 6, wherein the sharing request includes a condition of the first effect, wherein the first resource for the first effect including the condition does not exist, and
   generating the control instruction includes generating the first resource for the first effect that includes the condition and the first network address information of the first resource.

8. The effect sharing method of claim 7, wherein the condition includes an adjustment of one of,
   a color of the first effect,
   a size of the first effect,
   an application level of a lookup table, or
   another image that is generated for the first effect, and
   the first network address information of the first resource includes a uniform resource locator (URL) of the adjustment.

9. A non-transitory computer-readable medium storing instructions that, when executed, cause a computer to perform an effect sharing method, the effect sharing method comprising:
   presenting a plurality of effect sets applicable to an image displayed on a screen through an image editing logic;
   applying, to the image, an effect set selected from among the plurality of effect sets;
   sending, to an effect sharing server, a sharing request including an identifier of the effect set and an identifier of an electronic device;
   receiving a link to the effect set in response to the sharing request;
   receiving, from the effect sharing server, a control instruction to apply another effect set, the control instruction corresponding to an application-specific uniform resource locator scheme; and
   applying the other effect set to another image displayed on the screen in response to the control instruction,
   wherein the control instruction includes first network address information and second network address information, the first network address information corresponding to a first resource for a first effect included in the other effect set, and the second network address information corresponding to a second resource for a second effect in the other effect set.

10. The non-transitory computer-readable medium of claim 9, wherein receiving the link includes one of,
    receiving the link through a messaging service,
    receiving the link through an online posting that is uploaded online and that includes the link, or
    receiving the link from the effect sharing server.

11. The non-transitory computer-readable medium of claim 9, wherein receiving the link includes receiving another image to which the effect set has been applied and that includes the link.

12. The non-transitory computer-readable medium of claim 9, wherein applying the effect set includes applying the effect set to an input image received through a camera.

13. The non-transitory computer-readable medium of claim 12, wherein applying the effect set includes,
    recognizing a facial region in the input image, and
    applying makeup effects including the effect set to the facial region.

14. A non-transitory computer-readable medium storing instructions that, when executed, cause a computer to perform an effect sharing method, wherein the effect sharing method comprises:

extracting, from a parameter of a first image, an identifier of an effect set applied to the first image;

sending a sharing request including the identifier to an effect sharing server;

receiving, in response to the sharing request, a control instruction for applying the effect set, the control instruction including a call instruction of an application installed on the computer, the call instruction corresponding to a uniform resource locator scheme specific to the application; and applying the effect set to a second image in response to the control instruction, wherein the control instruction includes first network address information and second network address information, the first network address information corresponding to a first resource for a first effect included in the effect set, and the second network address information corresponding to a second resource for a second effect in the effect set.

15. The non-transitory computer-readable medium of claim 14, wherein
the first image is received over a network, and
the second image includes an input image received through a camera.

16. The non-transitory computer-readable medium of claim 14, wherein the effect set is selected from among a plurality of effect sets presented by an image editing logic for applying to an input image received through a camera.

17. The non-transitory computer-readable medium of claim 16, wherein,
the effect sharing method includes accessing the effect sharing server through a link received from the effect sharing server, and
receiving the control instruction includes receiving the control instruction from the effect sharing server in response to the accessing.

18. The non-transitory computer-readable medium of claim 16, wherein the effect sharing method further comprises:
recognizing a facial region in the input image; and
applying, to the facial region, makeup effects according to the effect set.

* * * * *